United States Patent [19]

Berney

[11] 4,348,813

[45] Sep. 14, 1982

[54] ELEVATION MEASURING INSTRUMENT WITH SELECTABLE MEASUREMENT SCALES

[75] Inventor: Jean Berney, Les Bioux, France

[73] Assignee: Les Fabriques d'Assortiments Reunies, Le Locle, Switzerland

[21] Appl. No.: 215,860

[22] Filed: Dec. 12, 1980

[30] Foreign Application Priority Data

Dec. 14, 1979 [CH] Switzerland ............ 11075/79

[51] Int. Cl.³ .................................. G01B 3/22
[52] U.S. Cl. .................................. 33/172 R; 33/147 R; 116/289
[58] Field of Search ............. 33/172 R, 172 B, 172 D, 33/169 R, 169 B, 172 F, 147 R; 116/289

[56] References Cited
U.S. PATENT DOCUMENTS 2,077,123  4/1937  Mahr ............................ 33/172 R
2,190,961  2/1940  Webber ......................... 33/172 R
3,483,627  12/1969  Olasz et al. ................... 33/172 R Primary Examiner—William D. Martin, Jr.
Attorney, Agent, or Firm—Berger & Palmer

[57] ABSTRACT

A microcomparator for elevation measurements having an amplification mechanism (3) which consists of a lever (31), the lever transforming the linear movement of a feeler (5) into a circular movement, and a lever arm (32) formed at least partly by calibrated rods (36) juxtaposed parallel to each other. The feeler (5) engages one of the calibrated cylinders (36) in accordance with the desired amplification factor without requiring altering the zero set for each change of scale. The amplification mechanism (3) and the display means (4) are fixedly connected with a carriage rotatably mounted on the housing (1) allowing a zero setting in such a manner that the display means always shows the same zero point as a function of the carriage (2). The microcomparator may also contain an automatic device for taking off measurements and a window containing a groove in which tolerance indicators may be carried.

16 Claims, 8 Drawing Figures

4,348,813

ELEVATION MEASURING INSTRUMENT WITH SELECTABLE MEASUREMENT SCALES

BACKGROUND OF THE INVENTION

The present invention is concerned with instruments for measuring elevations and is particularly concerned with microcomparators for such measurements to have a resolution of better than half a micron.

Prior instruments of this type differ mainly in the amplification mechanism that is used. They may be classified into two different groups.

The first group generally includes a stop connected to a feeler piston bearing with a straight bearing rod upon the shorter arm of a lever, which is pivotally mounted in the housing. The longer arm of the lever is furnished with a cogged segment meshing with the pinion of a multiplying geartrain which actuates the display means. The amplification is the result of the geometric relationship of the lever and the geartrain.

The arrangement of a straight bearing rod bearing against a circularly shaped cam allows variations of length of the shorter arm to be compensated. Such variations are caused, for example, by a slight transversal shift of the stop due to wear of the bearing guides of the feeler-piston. Such variations adversely affect the amplification and precision of measurement.

The first group of microcomparators also have means to adjust the amplification and, therefore, the sensitivity of the device. Such devices are described, for example, in Swiss Pat. No. 569 951 and include several movable cooperating mechanical parts.

Such devices suffer from the disadvantages of having a large number of movable parts positioned with great precision, which is expensive and time consuming.

Another group of microcomparators have a simpler construction. These are schematically shown in FIG. 1, where the amplification is caused by a lever having a shorter arm and a longer arm. The longer arm carries a cogged sector which directly engages a pinion which drives the indicator needle. The amplification is determined by the relation between the lengths of the arms.

Since the length of the longer arm is limited by the outer dimensions of the device, it is understood that the shorter arm must be much shorter than in the devices of the first group of comparators described above in order to obtain sufficient amplification, on the order of amplification by a factor of one thousand. Therefore, the same deviation in the stop of the same variation of the length of the shorter arm will be greatly amplified and affect the measurements being made. Furthermore if the dimension of the device is to be maintained fixed, the prior art does not allow for varying the amplification.

Therefore, the prior art has failed to provide measurement apparatus which can provide precise measurements with large amplification at reasonable costs and which can permit easy adjustment of amplification.

It is an object of the present invention to provide an instrument for elevational measurements that is economical and solves the above-mentioned problems.

Another object of the present invention is to provide a microcomparator which allows easy changing from one amplification scale to another one.

Another object of the present invention is to provide a microcomparator which may be reset at zero easily, rapidly and practically.

SUMMARY OF THE INVENTION

These objects and others will become more apparent from the following description. In particular, the present invention provides a shorter arm containing a series of calibrated cylindrical parts, where the arm contacts the supporting stop, the parts being positioned next to each other and being mounted to be parallel to the pivoting axis of the lever mechanism of the measuring apparatus.

These cylindrical parts form amplification factor gauges and the supporting stop comprises a ruby ring, sitting upon a bar which is fixedly connected to the feeler piston and held against it by a compression spring. The invention also includes special means for mounting the instrument so that it pivots within the casing, means to read the measurements and an advantageous construction of the housing and of the sight glass.

Additional advantages, characteristics and details of the invention will become more apparent hereinafter.

DETAILED DESCRIPTION

Figure 1:
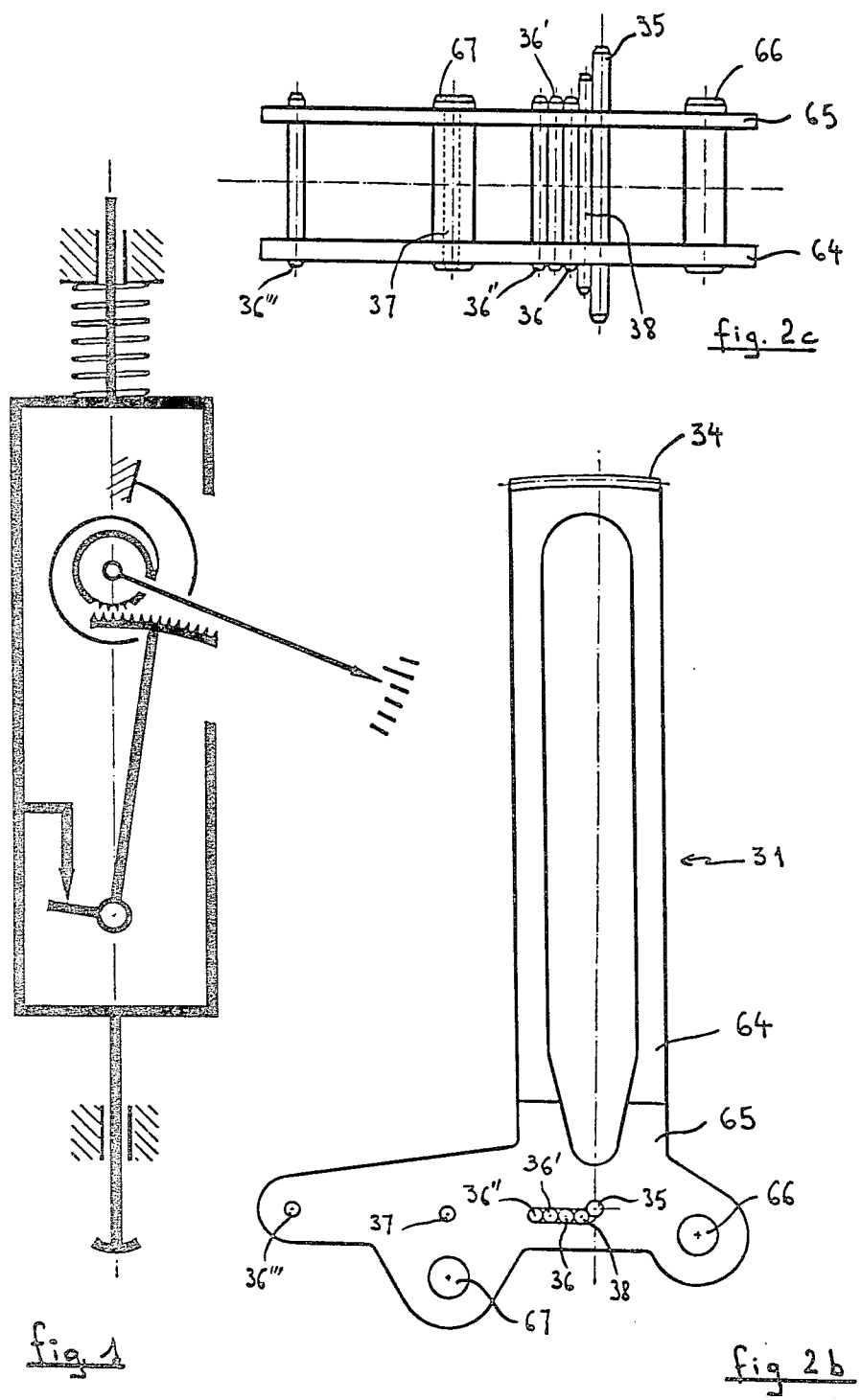
FIG. 1 is a schematic view of a prior art microcomparator.
Figure 2:
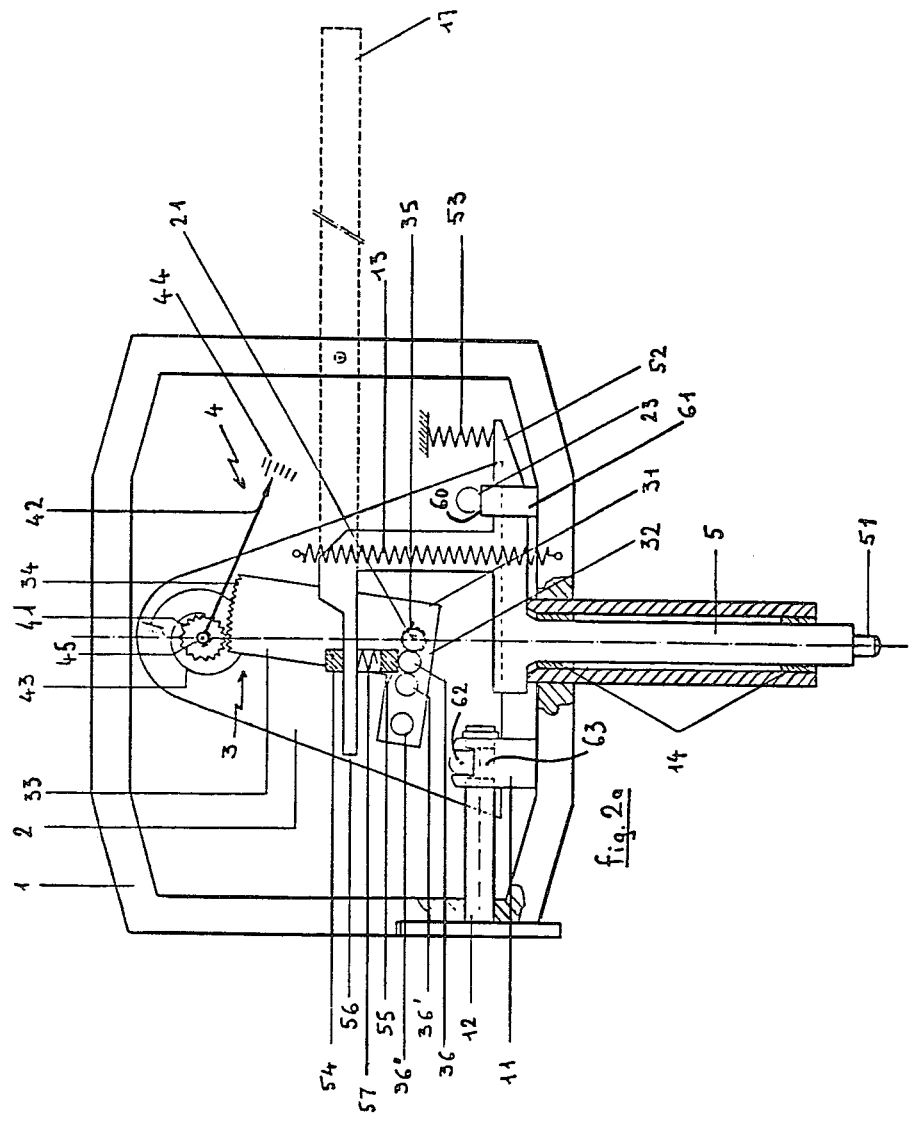
FIG. 2a is a sectional view of the elevation measurement device according to the invention.
FIG. 2b is a front view of the lever part of the microcomparator of the invention.
FIG. 2c is a bottom view of the microcomparator.

Referring to FIG. 2a, the microcomparator of the present invention comprises a housing 1, from the bottom of which extends a feeler 51, mounted rigidly at the end of a feeler piston 5, axially linked into a guiding means 14, disposed at one side of the housing 1. A carriage 2 is contained within the housing and comprises two parallel plates located on opposite sides of the feeler piston 5. Within carriage 2 are mounted an amplifying mechanism 3 and display means 4.

The amplifying mechanism 3 is formed by an L-shaped lever 31, which pivots on an axle 21, at the corner of the L. The lever 31 having shorter lever foot segment 32 and a longer vertical arm leg segment 33. A cogged circular sector surface 34 is provided at the upper end of the arm 33. The surface 34 is centered about the axle 21, said surface 34 engaging with a pinion 41 of a needle 42 for displaying the measurement.

The display means 4 contains a scale 44 which is an integral part of the carriage 2 and is visible from outside the housing.

A pointer 42 is connected to the pinion 41 which rotates around an axle 45 within the holder. Thus movement of pinion 41 will always cause corresponding movement for pointer 42.

The feeler piston 5 is connected to a U-shaped member 56 which includes an upper carrying bar segment, extending perpendicular to the direction of displacement of the piston 5. Piston 5 drives a stop 54 which contacts the short lever arm 32 through a rectilinear bearing edge 55. The bearing edge 55 which makes contact with lever arm 32 is simultaneously perpendicular to the direction of displacement of the feeler piston 5 and to the pivoting axle of lever 31. Preferably, the upper bar segment of member 56 has a rectangular cross-section which passes through the stop 54, the stop 54 comprising a ruby ring. The facing section of the ruby ring which is opposite to the bearing edge 55 is held against bar 56 by a compression spring 57. Spring 57 acts as a shock absorber when the feeler piston 5 is suddenly released.

The shorter arm 32 of lever 31 comprises a series of adjacent calibrated cylindrical members or gauging rods 36, 36' and 36" in the area in which contact is made with the rectilinear bearing edge of the stop 54. The members are mounted parallel to the pivoting axle 21 of lever 31. This pivoting axle 21 is also constituted by a calibrated cylindrical rod 35.

The position of the contact point of the rectilinear bearing edge 55 with one of the adjacent rods, 36, 36' is independent of the slight transversal shift of the stop 54. Additionally, the point of contact may be formed with excellent precision. In fact, the position of rod 35 upon the lever is not critical, because the axle of the rod coincides automatically with the pivoting axle of the lever. Further, the length of arm 32 (and thereby the relative amplification) is obtained directly with a precision as large as the order of magnitude of the tolerances of the adjacent rods used. As the contact rod, 36, 36' and 36" moves further to the left, the amplification factor decreases. For low values of said factor, the position of the corresponding rod is less critical, and therefore such rods, as for example rod 36" may be mounted isolated from the others at the end of arm 32. In other words, it is not necessary that the series of adjacent rods be continued up to rod 36".

Changes of scale may be effected either by using interchangeable feeler pistons 5 with varying lengths of the supporting arm for the stop 54, or by providing access to stop 54 from outside the housing through an aperture so that rectilinear bearing edge may be moved to bear on any one of the rods 36, 36' or 36".

A compression spring 53 exerts constant pressure upon a projection 52 of the U-shaped member 56 of the feeler piston 5 in order to hold stop 54 against the short arm 32 of lever 31. As explained further, this projection 52 acts also as a guiding arm for the feeler piston. The contact between the stop 54 and arm 32 is also assisted by a spiral retracting spring 43 mounted between the carriage 2 and the pinion 41. This spring maintains continuous one way pressure between the pinion 41 and sector 34.

The carriage 2 is rotatably mounted to the housing 1 around an axle which is parallel to the pivoting axle of lever 31. In the embodiment described in the drawing, this rotation axle consists of a roller 23, said roller being an integral part of the carriage 2 and being capable of rolling upon a bearing surface 60. This bearing surface 60 is formed on the top of two projections 61 which are integral with case 1. The distance between the two projections 61 is capable of receiving and guiding projection 52 of the feeler piston 5. Preferably, the diameter of the projections 61 is such that they ensure the lateral guidance of two sides which form the carriage, the projections 61 being disposed between the two sides.

The carriage further comprises a regulating member which consists of a cylindrical peg 62 which, as roller 23, forms a bracing element between the two sides of the carriage. This peg 62 is held in a guiding link 11, but its position parallel to the axle of the feeler piston 5 may be regulated from the outside of the casing by means of a stem 12 drawing an eccentric cam 63. The roller 23 and the peg 62 are respectively held against the bearing surface 60 and the cam 63 by the tension of a spring 13 disposed between the carriage 2 and the case 1.

The arrangement of the carriage 2 inside the housing 1 is provided in order to allow an easy zero setting. When the end of the feeler 51 contacts a reference surface, needle 42 can be moved into a zero position without displacing the casing 1. That is done by adjusting the rod 12 and rotating the carriage 2 and the amplification mechanism and display means which it carries. While the feeler piston 5 and stop 54 are held fixed, the above action alters of the angular position of the lever arm 32 relatively to the carriage thus adjusting the location of needle 42.

FIGS. 2b and 2c show an embodiment of the lever 31 of the microcomparator. Lever 31 consists of a plate 64 carrying the cogged sector 34, and of a holding plate 65, both plates being parallel to each other and being joined by braces 66 and 67. The gauging rods 35, 36, 36', 36", 36''' and 37 are mounted and held for example through sticking in corresponding apertures of plate 64 and holding plate 65. Rod 34, which is the longest, serves as axle of rotation of the lever 31 and its ends are mounted in ruby bearings, shown schematically at 39 and which are integral with the carriage. A rod 38 fastened next to rod 35 has an intermediate length and its ends rest upon the circumference of the ruby bearings, in order to assure the centering of the lever in the holder. In order to prevent misalignment of the null point, the rods 36, 36' and 36" and -for smaller amplification, the isolated rods 36''' and 37 are aligned in such a manner that their common tangent intersects the rotational axis of lever 31, in other words the axle of gauge 35. Said tangent is located on the side of the surface 34 and is represented by a broken line in FIG. 2c.

Figure 3:
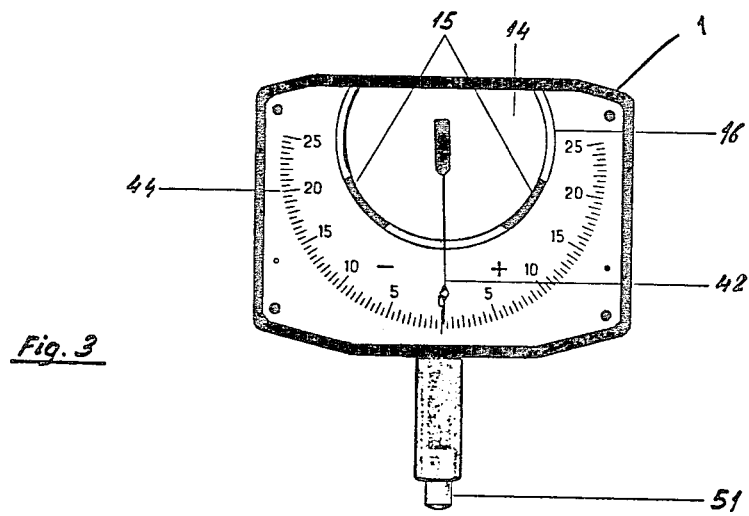
FIG. 3 is a plan view of the indicator face of the measurement instrument according to the invention.
Figure 4:
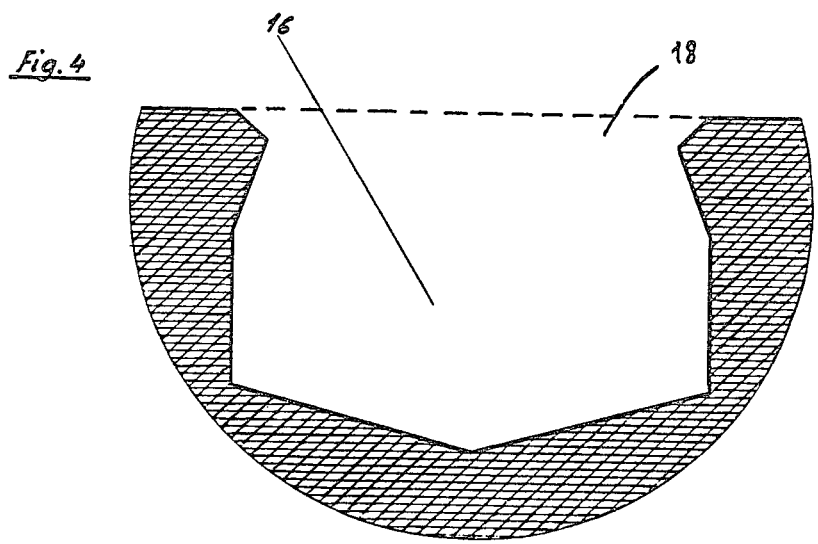
FIG. 4 is a sectional view of the groove portion through the viewing glass of the housing shown in FIG. 3.

FIG. 3 is a view of the measurement face of the device showing housing 1, the feeler 51 projecting from the housing with a dial 44 and needle 42 located behind a window 14. It is preferred for the case to be made of a profiled tube and for the window to comprise acrylic resin. The window contains a groove 16 whose size decreases towards the front aperture 18, said aperture being disposed in the surface of the window, as shown in FIG. 4. This groove 16 may accept indicators 15, for example, in order to indicate the limits of tolerances. They consist, for example, of helical springs or other opaque elements and may be manually placed by using a finger to slide the members along the groove 16. The indicator device advantageously replaces supplementary needles which are actuated by knobs.

The particular arrangement of the carriage inside the housing allows the zero-setting to associate a unique position of the needle in front of a fixed dial with any value of the chosen reference, which is compared to the conventional method of moving the dial in order to obtain the "0" position behind the needle.

Figure 5A:
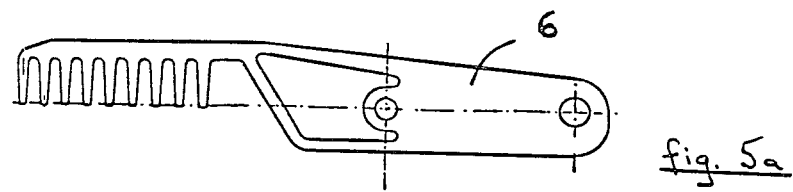
FIGS. 5a and 5b are schematic views of an embodiment of the invention permitting automatic release of measurements are completed.
Figure 5B:
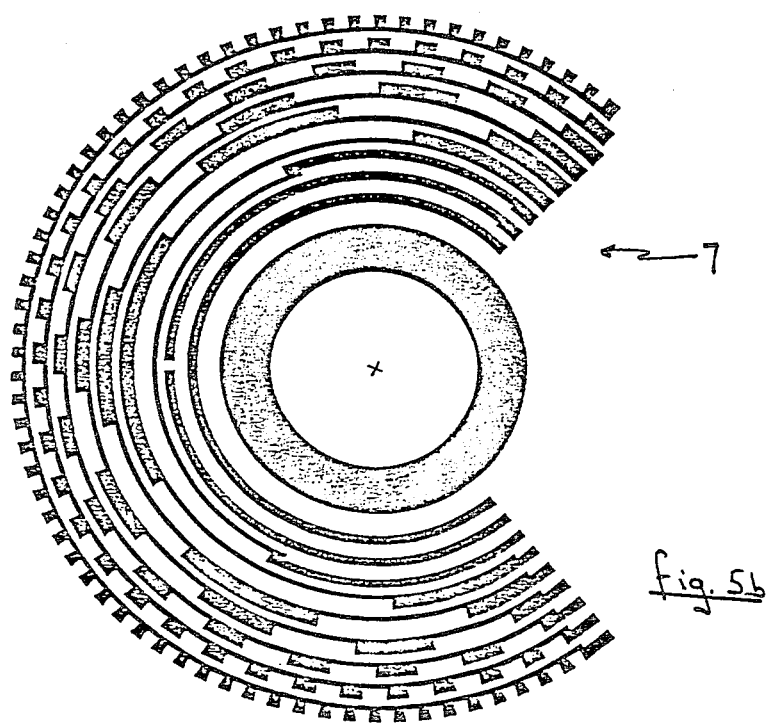

This embodiment is particularly well adapted to the automated measurements. For such measurements, a metallic comb 6 (FIG. 5a) rotated by pinion 41 is capable of being moved from outside the housing. The comb 6 cooperates with a coding circuit 7 (FIG. 5b) to deliver an electrical signal as a function of the position of needle 42 (and comb 6) according to the measurement, but not depending on the regulation of the zero point, which was set before.

The present invention provides performance equivalent to the best microcomparators on the market in regard to precision and ease of use. This is achieved despite a simple construction. For example most of the components, like the sides and the lever may be produced by diecutting, the housing is merely a profiled pipe and the indicating marks are easily engraved into an acrylic face plate. The precision of the instrument is directly related to the precision of the rods and is maintained despite an easy assembly of the parts. Most of the components may be riveted onto their supports, and the carriage freely moves upon its support plane and in its guiding strip.

As another embodiment, analogous to the device of the invention, the stop 54 is moved by a feeler. Through a lever 17 (FIG. 2a) pivoting relative to the housing instead of by using a feeler piston, rod working along the axis.

Variations and modifications can, of course, be made without departing from the spirit and scope of the invention.

Having thus described my invention what I desire to secure by Letters Patent and hereby claim is:

1. A microcomparator measuring instrument comprising a housing, and a feeler extending therefrom, a feeler piston activated by said feeler, said piston being axially displaceable, an amplification mechanism for amplifying the displacements of the feeler piston onto display means, said amplification mechanism and said display means being mounted in a carriage disposed in said housing, said amplification means comprising an L-shaped lever pivoting around an axle at its base in relation to the carriage, said L-shaped lever having a longer leg segment and a shorter foot segment, said display means driven by the longer leg segment of said lever, wherein said shorter foot segment contacts a rectilinear bearing edge of a stop mounted on said feeler piston, said shorter foot segment comprising a plurality of adjacent cylindrical calibrated rods mounted parallel to the pivoting axle of the lever, said scale of amplification being changed as said contact surface bears on a selected rod of said plurality of calibrated rods.

2. A measuring instrument according to claim 1, wherein the cylindrical calibrated rods are standard gauging rods.

3. A measuring instrument according to claim 2, further comprising a cylindrical rod forming the pivoting axle of the lever, said cylindrical rod being a standard gauging rod.

4. A measuring instrument according to claim 1, 2 or 3, wherein said feeler piston comprises an upper carrying bar integrally connected to the feeler piston and extending perpendicularly to the direction of displacement of said piston, said carrying bar comprising a rectangular cross-section and passing through a stop constituted by a ruby the section of said ring opposite to the bearing edge being held against said bar by a compression spring.

5. A measuring instrument according to claim 3, wherein said stop is slideable along said carrying bar so that said rectilinear bearing edge selectively may bear against a cylindrical calibrated rod.

6. A measuring instrument according to claim 1, 2, or 3, wherein said carriage is mounted in the housing pivoting around an axle parallel to the pivoting axle of the L-shaped lever.

7. A measuring instrument according to claim 6, wherein the pivoting axle of the carriage comprises a roller integrally connected to the carriage capable of rolling upon a bearing surface, said bearing surface being formed as an integral part of the housing, a spring pressing said roller against said bearing surface, said carriage further comprises a regulating member, said regulating member being movable parallelly to the axis of displacement of the feeler piston and being capable of being regulated from outside the housing.

8. A measuring instrument according to claim 7, wherein, said bearing surface is formed on the top of two projections, wherein the spacing between said projections serves as a guide for a guiding arm extending from the feeler piston.

9. A measuring instrument according to claim 8, further comprising guiding means provided at one side of said housing, said feeler piston moving with such guiding means.

10. A measuring instrument according to any one of claims 1, 2 or 3, further comprising means to automatically register the measurements of said measuring instrument.

11. A measuring instrument according to claim 10, wherein said means to automatically register measurements comprise a comb structure, said comb structure forming an integral part of the indicator of the display means, and a coding circuit cooperating with said comb structure to provide electrical signals related to the position of the indicator.

12. A measuring instrument according to any one of claim 1, 2 or 3 further comprising a window in said housing for the display means, wherein said window comprises a groove and displaceable reference markers movable therein.

13. A measuring instrument according to claim 11, wherein displaceable reference markers comprise coiled springs.

14. A measuring instrument according to claim 12, wherein said window comprises an acrylic material.

15. A measuring instrument according to claim 1, 2 or 3, wherein said housing is formed of a profiled metallic tubing.

16. A measuring instrument according to claims 1, 2 or 3, wherein said feeler is carried on a lever pivotable on said housing said lever operating the displacements of said feeler-piston.

* * * * *